Figure 1:
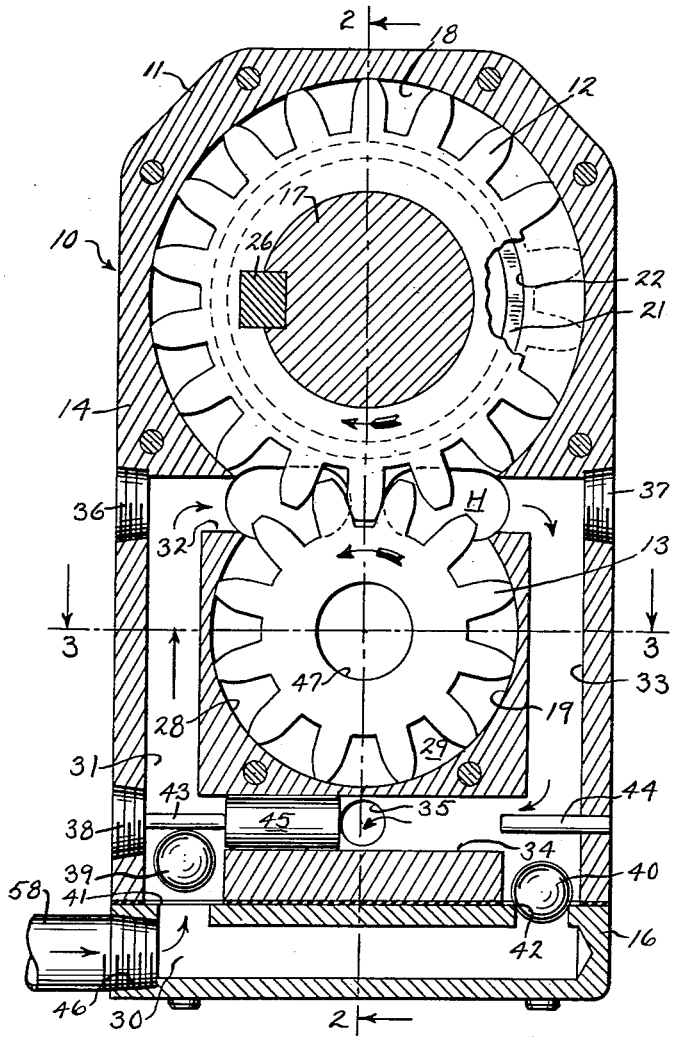

Feb. 4, 1964     W. P. SCHMITTER ET AL     3,120,190
GEAR PUMP
Filed March 2, 1961                                           2 Sheets-Sheet 1

INVENTORS
WALTER P. SCHMITTER, deceased,
By A. LOUISE SCHMITTER,
ROBERT V. ABENDROTH, Co-Executor
GALE V. HIGHSMITH BY *Adrian C. Bateman*

ATTORNEY

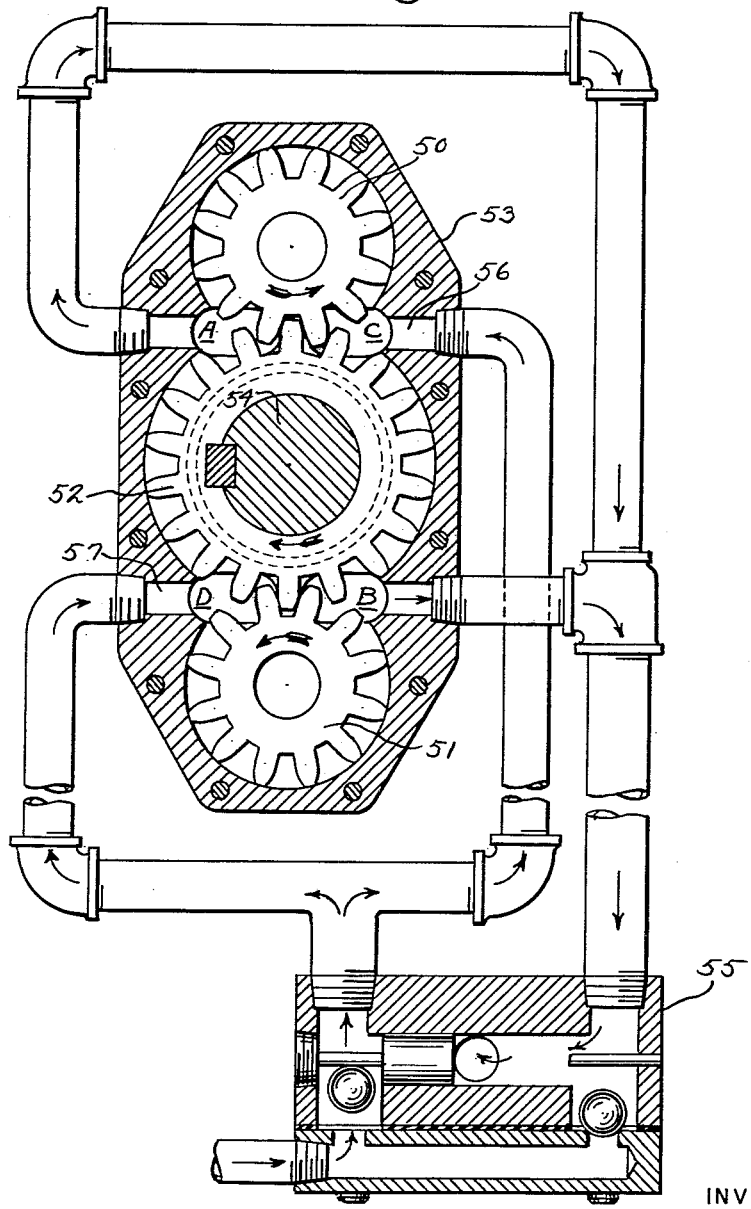

United States Patent Office 3,120,190
Patented Feb. 4, 1964

3,120,190
GEAR PUMP
Walter P. Schmitter, deceased, late of Wauwatosa, Wis., by A. Louise Schmitter, Wauwatosa, and Robert V. Abendroth, Whitefish Bay, Wis., co-executors, and Gale V. Highsmith, Milwaukee, Wis., assignors to The Falk Corporation, Milwaukee, Wis., a corporation of Wisconsin
Filed Mar. 2, 1961, Ser. No. 92,996
4 Claims. (Cl. 103—117)

This invention relates to gear pumps and, more particularly, to gear pumps which have shaftless gears and are, therefore, capable of direct mounting upon and drive by the shafts of rotatable machinery and, when so mounted, occupy a minimum amount of space.

Many modern machines require the use of an auxiliary pump and associated piping to provide a source of circulating lubrication under sufficient pressure to insure adequate lubrication for the moving elements in either the machine or allied equipment, e.g. transmission gears, speed reducers, motors, etc. The pumps presently available that are suitable for such purposes are generally cumbersome units which require independent mounting supports and one or more independent drive shaft couplings, which equipment takes up an undesirably large amount of space. It is an object of the present invention to provide a gear pump that is extremely simple in construction and which has a minimum of parts arranged to provide a highly compact and efficient pump unit that may be mounted directly on and supported by a rotating shaft in a minimum of space and is thus particularly useful as a shaft-mounted auxiliary pump for pressure lubrication systems.

A further object of the invention is to provide a shaft mountable pump having lubricant inlet and outlet ports disposed to utilize the piping associated with the lubricant circulating system as torque reaction means without exerting objectionable forces thereon.

Another object of the invention is to provide pressure balanced seals for the shaftless driver gear of the pump which effectively seal the pump chamber against leakage while permitting free rotation of the gear and providing a wear surface.

A still further object of the invention is to provide a gear pump entirely devoid of shafts and shaft bearings.

The gear pump of the present invention includes a driver gear adapted for shaft-mounting and one or more idler gears meshing therewith enclosed in a pump casing supported by the driver gear, the gears having no supporting shafts or bearings, thereby creating an extremely compact pump.

The two embodiments of the present invention selected for purposes of disclosure are intended to be illustrative only, and the invention, therefore, is not limited to the particular arrangements shown.

Figure 2:
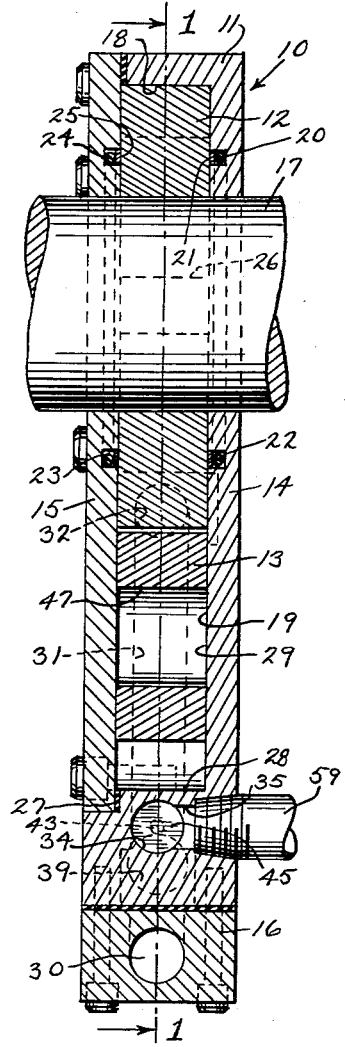
Figure 3:
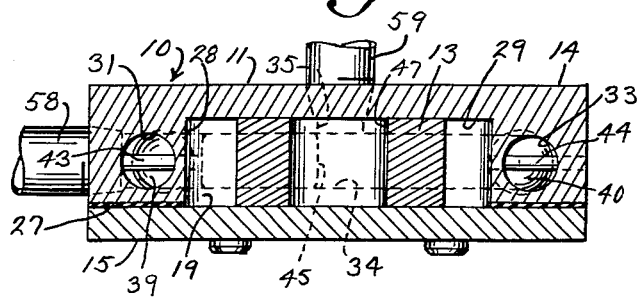

In the drawings:
FIG. 1 is a sectional view of a two-gear pump constructed in accordance with the present invention, taken along the vertical plane of line 1—1 of FIG. 2;
FIG. 2 is a vertical sectional view taken along the plane of line 2—2 of FIG. 1, looking in the direction of the arrows;
FIG. 3 is a transverse sectional view taken along the plane of line 3—3 of FIG. 1, looking in the direction of the arrows; and
FIG. 4 is a view, partly in section, of a three-gear pump constructed in accordance with the present invention illustrated in conjunction with an external piping and valve system.

There is illustrated in FIGS. 1, 2 and 3, a two-gear pump 10 comprising a pump casing 11 enclosing a driver gear 12 that meshes with an idler gear 13. As shown in FIG. 2, the pump casing 11 is formed of three members suitably joined by bolts, including a main housing 14, a cover plate 15 and an end piece 16. An upper chamber 18 and a lower chamber 19 interconnected along a segmental portion of their peripheral walls are bored into housing 14 to receive driver gear 12 and idler gear 13, respectively. Each chamber should be large enough to permit rotation of the gear inserted therein and yet provide a relatively snug enclosure for the gear, both peripherally and laterally. Driver gear 12 has a central aperture adapted to receive a drive shaft 17 and to be rotated thereby through a key 26 inserted in mating key slots formed in driver gear 12 and drive shaft 17. A portion only of drive shaft 17 is shown, it being understood that it may be a motor output shaft, a speed reducer shaft, or any other rotatable shaft. It is thus apparent that rotation of drive shaft 17 will cause the driver gear 12 and meshing idler gear 13 to rotate and thereby develop fluid pumping action in a manner well-known to those skilled in the art.

As shown in FIG. 2, an elastically deformable O-ring seal 20 of rubber, neoprene or the like and a substantially incompressible annular shim 21 of metal, plastic or the like are inserted between the rear face of driver gear 12 and the housing 14, with the shim 21 abutting driver gear 12, there being a suitable annular slot 22 cut into housing 14 to receive the seal and shim. A similar annular slot 23 is formed in cover plate 15 to receive a similar O-ring seal 24 and annular shim 25 bearing against the front surface of driver gear 12. Leakage of fluid around the sides of driver gear 12 due to the pressure generated in pump chamber 18 is thus prevented. A gasket 27 is inserted between the abutting marginal portions of cover plate 15 and housing 14 to seal these portions of the pump casing against fluid leakage.

As is clearly shown in the drawings, both driver gear 12 and idler gear 13 are peripherally retained in the housing 14 by contact along the addendum circle of the gears with the peripheral walls of chambers 18 and 19 respectively and neither gear has a supporting shaft nor end bearings. Peripheral contact of driver gear 12 with chamber 18 renders support to the pump housing 14. Axial floating of idler gear 13 is prevented by the rear wall of chamber 19 and cover plate 15. If desired, an axial aperture may be cut in idler gear 13, as at 47, to reduce its weight. By eliminating shaft and bearing members, a pump is provided that, due to its compactness, may be mounted upon a rotatable shaft in a minimum axial space and the pump is thus especially useful as an auxiliary pressure lubrication pump for attachment to a variety of machines without special adaptation thereof or interference with other functions of the machines.

The pump 10 may be further adapted to provide unidirectional fluid flow regardless of the direction of rotation of the drive shaft and gears by means of the valve and fluid channel system illustrated in FIG. 1. A transverse inlet channel 30 formed in end piece 16 is interconnected with a second transverse channel 32 by a pair of vertical channels 31 and 33, channels 31, 32 and 33 being formed in housing 14. A transverse valve channel 34 interconnects channels 31 and 33. A threaded outlet channel 35 is cut through the back wall of housing 14 and communicates with the mid-portion of channel 34. All the channels may be bored in the respective casing members, channel 32 being bored inwardly from opposite edge portions of housing 14 and having its ends subsequently closed by threaded plugs 36 and 37. Channel 34 may also be bored inwardly from an edge portion of housing 14 with its end similarly sealed by threaded plug 38. Ball check valves 39 and 40 rest on valve seats 41 and 42 that are located at the lower ends of channels 31 and 33, respectively where said channels connect with channel 30. Stop pins 43 and 44 are positioned approximately along the axis of channel 34 to limit the upward movement of ball check valves 39 and 40, respectively. Pin 44 may be fixedly inserted in housing 14, while pin 43 may conveniently be attached to plug 38. Slide valve 45 is inserted in channel 34 for sliding movement therein, the extent of such sliding movement being limited by the ends of pins 43 and 44 so that it will not block either channel 31 or channel 33 when in its extreme end positions. Slide valve 45 fits rather snugly in channel 34 to substantially prevent seepage of fluid therethrough. When slide valve 45 is in either of its end positions, the outlet channel 35 is uncovered for the passage of fluid from the pump casing. As shown by the arrows in FIG. 1, during clockwise rotation of drive shaft 17, driver gear 12 and idler gear 13 will rotate in the directions indicated and high pressure fluid will flow down channel 33 to force ball check valve 40 downwardly against valve seat 42 and will also flow through channel 34 to move slide valve 45 to its extreme left end position thereby uncovering outlet channel 35. Low pressure fluid entering channel 30 will unseat ball check valve 39 (the upward motion of the ball 39 being limited by engagement with pin 43) and move upwardly through channel 31 to enter channel 32, after which it will be carried around upper chamber 18 and lower chamber 19 between the teeth of driver gear 12 and idler gear 13, respectively, to the high pressure side H of channel 32, from where it will travel through outlet channel 35 via channels 33 and 34 as aforesaid. Outlet channel 35 and the inlet end 46 to channel 30 are threaded to receive conventional threaded fittings for the connection of fluid tubing thereto, portions of such tubing being illustrated in the drawings. When shaft 17 rotates counterclockwise, ball check valve 40 will raise, ball check valve 39 will seat against valve seat 41 and slide valve 45 will be moved to its right end position. Low pressure fluid will then enter channel 30, move upwardly through channel 32, pass around the rotating gears and downwardly through channel 31 as high pressure fluid, and then pass through outlet channel 35. Thus, regardless of the direction of rotation of shaft 17, the fluid flow externally of the pump 10 will be in the same direction.

A three-gear pump embodying the principle of the present invention is illustrated in FIG. 4. Two idler gears 50 and 51 mesh with a single driver gear 52 on opposite sides thereof, all three gears being enclosed within casing 53. A cover, not shown, completes the enclosure of the gears within said casing in the manner previously described with reference to FIGS. 1, 2 and 3. Driver gear 52 is keyed to drive shaft 54 in driving relation, with the seal and shim arrangement, not shown, described previously being used along front and rear faces of the casing 54 and the driver gear 53 to prevent fluid leakage. An external piping and valve arrangement is shown in FIG. 4, with the valve system 55 being similar to that described above for the two-gear pump to maintain unidirectional fluid flow. The external piping cross-connects opposite ends of transverse channels 56 and 57 for low pressure fluid ingress and high pressure fluid egress. During clockwise rotation of shaft 54, A and B will be the high pressure portions of channels 56 and 57 respectively, while C and D will be the respective high pressure portions during counterclockwise rotation. Other constructional details, the action of the valve system, and fluid transport within the piping may be readily understood by one skilled in the art by reference to the above description for the two-gear pump and details thereof need not be repeated here. If desired, an internal piping and valve system may be readily incorporated within the casing of the three-gear pump in the manner generally described above for the two-gear pump. With the transverse channels 56 and 57 cross-connected, as shown, the three-gear pump will deliver approximately twice the volume of fluid obtainable from the two-gear pump described above, without commensurate increase in the size and weight of the pump.

By reference to FIGS. 1, 2 and 3, it will be apparent that the pump unit may be readily installed on the existing shaft of associated machinery without special adaptation thereof. Further, the pipe connections to the fluid system illustrated, for example, at 58 and 59 in FIGS. 2 and 3, respectively, perform the additional function of resisting torque in the pump casing whereby the same is anchored against rotation about the driving shaft. Minimum force may be exerted against the aforesaid piping system by locating the piping connections to the pump housing a substantial distance from the driving shaft.

We desire it to be understood that this invention is not to be limited to any particular form or arrangement of parts, except insofar as such limitations are included in the appended claims.

We claim:

1. A shaft mountable gear pump for increasing fluid pressure comprising, in combination: a pump casing having a pair of peripherally interconnecting cylindrical gear chambers formed therein; a pair of intermeshing gears rotatably arranged in said gear chambers and substantially enclosed thereby, one of said gears being a driver gear and the other of said gears being a shaftless idler gear supported by the wall portions of its respective gear chamber; said driver gear and opposed wall portions of said casing being provided with axially aligned drive shaft openings for the passage therethrough of a drive shaft to drivingly engage said driver gear and support said pump; an annular channel formed in each said opposed wall portion to encircle the drive shaft opening therein; an elastically deformable seal and a substantially incompressible ring shaped shim inserted in each of said two annular channels with the shims in abutting relationship with opposed side surfaces of the driver gear; inlet and outlet channels for said pump casing, fluid flow channels interconnecting said inlet and outlet channels arranged to permit the flow of fluid through said gear chambers and around the teeth of said gears; and valve means arranged to provide unidirectional flow of fluid through said channels during both clockwise and counter-clockwise rotation of said driver gear.

2. A shaft mountable gear pump for increasing fluid pressure comprising, in combination: a pump casing having a pair of peripherally interconnecting cylindrical gear chambers formed therein; a pair of intermeshing gears rotatably arranged in said gear chambers and substantially enclosed thereby, one of said gears being a driver gear and the other of said gears being a shaftless idler gear supported by the wall portions of its respective gear chamber; said driver gear and opposed wall portions of said casing being provided with axially aligned drive shaft openings for the passage therethrough of a drive shaft to drivingly engage said driver gear and support said pump; an annular channel formed in each said opposed wall portion to encircle the drive shaft opening therein; an elastically deformable seal and a substantially incompressible ring shaped shim inserted in each of said two annular channels with the shims in abutting relationship with opposed side surfaces of the driver gear; inlet and outlet channels for said pump casing, and fluid flow channels interconnecting said inlet and outlet channels arranged to permit the flow of fluid through said gear chambers and around the teeth of said gears.

3. A shaft mountable gear pump for increasing fluid pressure comprising, in combination: a pump casing having a plurality of cylindrical gear chambers formed therein, each gear chamber being bisected by a common straight line and adjacent gear chambers being peripherally interconnected; intermeshing gears rotatably arranged in said gear chambers and substantially enclosed thereby, one of said gears being a driver gear and the remainder of said gears being shaftless idler gears supported by the wall portions of their respective gear chambers; said driver gear and opposed wall portions of said casing being provided with axially aligned drive shaft openings for the passage therethrough of a drive shaft to drivingly engage the driver gear and support the pump; an annular channel formed in each said opposed wall portion to encircle the drive shaft opening therein; an elastically deformable seal and a substantially incompressible ring shaped shim inserted in each of said two annular channels with the shims in abutting relationship with opposed side surfaces of the driver gear; inlet and outlet channels for said pump casing, fluid flow channels interconnecting said inlet and outlet channels arranged to permit the flow of fluid through said gear chambers and around the teeth of said gears; and valve means arranged to permit unidirectional flow of fluid through said channels during both clockwise and counterclockwise rotation of said driver gear.

4. A shaft mountable gear pump for increasing fluid pressure comprising, in combination: a pump casing having a plurality of cylindrical gear chambers formed therein, each gear chamber being bisected by a common straight line and adjacent gear chambers being peripherally interconnected; intermeshing gears rotatably arranged in said gear chambers and substantially enclosed thereby, one of said gears being a driver gear and the remainder of said gears being shaftless idler gears supported by the wall portions of their respective gear chambers; said driver gear and opposed wall portions of said casing being provided with axially aligned drive shaft openings for the passage therethrough of a drive shaft to drivingly engage the driver gear and support the pump; an annular channel formed in each said opposed wall portion to encircle the drive shaft opening therein; an elastically deformable seal and a substantially incompressible ring shaped shim inserted in each of said two annular channels with the shims in abutting relationship with opposed side surfaces of said driver gear; inlet and outlet channels for said pump casing, and fluid flow channels interconnecting said inlet and outlet channels arranged to permit the flow of fluid through said gear chambers and around the teeth of said gears.

References Cited in the file of this patent

UNITED STATES PATENTS

| | | |
|---|---|---|
| 1,223,734 | Rinehart | Apr. 24, 1917 |
| 1,663,253 | Hillborn | Mar. 20, 1928 |
| 2,354,992 | Gottlieb | Aug. 1, 1944 |
| 2,397,480 | Fullerton | Apr. 2, 1946 |
| 2,550,405 | Crosby | Apr. 24, 1951 |
| 2,589,528 | Bergsma | Mar. 18, 1952 |
| 2,607,295 | Drucker | Aug. 19, 1952 |
| 2,626,570 | Armington et al. | Jan. 27, 1953 |
| 2,865,301 | Thomas | Dec. 23, 1958 |
| 2,880,676 | Succop | Apr. 7, 1959 |
| 2,968,251 | Eames et al. | Jan. 17, 1961 |
| 3,019,737 | Prasse | Feb. 6, 1962 |

FOREIGN PATENTS

| | | |
|---|---|---|
| 434,109 | Italy | Apr. 21, 1948 |
| 520,873 | Belgium | July 15, 1953 |
| 884,344 | France | Apr. 19, 1943 |